(12) United States Patent
Shi (10) Patent No.: US 12,197,079 B2
(45) Date of Patent: Jan. 14, 2025

(54) BACKLIGHT BOARD, MANUFACTURING METHOD AND DISPLAY PANEL

(71) Applicant: TCL China Star Optoelectronics Technology Co., Ltd., Guangdong (CN)

(72) Inventor: Zhuonan Shi, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/907,987

(22) PCT Filed: Aug. 8, 2022

(86) PCT No.: PCT/CN2022/110822
§ 371 (c)(1),
(2) Date: Aug. 30, 2022

(87) PCT Pub. No.: WO2024/026903
PCT Pub. Date: Feb. 8, 2024

(65) Prior Publication Data
US 2024/0264489 A1 Aug. 8, 2024

(30) Foreign Application Priority Data
Aug. 1, 2022 (CN) .......................... 202210916195.9

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01); *G02F 1/133605* (2013.01); *G02F 1/133606* (2013.01); *G02F 1/133608* (2013.01)

(58) Field of Classification Search
None
See application file for complete search history.

(56) References Cited

U.S. PATENT DOCUMENTS

2021/0124194 A1* 4/2021 Liu .................... G02F 1/133528
2021/0349350 A1* 11/2021 Fu ..................... G02F 1/133606
(Continued)

FOREIGN PATENT DOCUMENTS

| CN | 110225651 | 9/2019 |
| CN | 110398857 | 11/2019 |

(Continued)

OTHER PUBLICATIONS

International Search Report and the Written Opinion Dated Dec. 28, 2022 From the International Searching Authority Re. Application No. PCT/CN2022/110822 and Its Translation Into English. (18 Pages).

(Continued)

*Primary Examiner* — Ryan Crockett (57) ABSTRACT

The present application relates to a backlight board, a manufacturing method, and a display panel. A substrate of the backlight board carries a reflective layer, a white oil layer, soldering pads, and lamp beads. Windows are defined in the white oil layer. Soldering pads are disposed in the windows. The lamp beads are electrically connected to the soldering pads. The reflective layer is configured to reflect light emitted from the electrified lamp beads, which achieves reflection of light emitted from the lamp beads to the reflective layer, improvement of reflectivity of the backlight board, and enhancement of a light usage rate of the backlight board.

13 Claims, 4 Drawing Sheets

(56) References Cited

U.S. PATENT DOCUMENTS

2022/0320060 A1   10/2022   Qiu et al.
2022/0320368 A1   10/2022   Hu
2022/0375911 A1*  11/2022   Li .................... G02F 1/133603

FOREIGN PATENT DOCUMENTS

| | | |
|---|---|---|
| CN | 111505868 | 8/2020 |
| CN | 111524931 | 8/2020 |
| CN | 112241088 | 1/2021 |
| CN | 113270437 | 8/2021 |
| CN | 113985652 | 1/2022 |
| CN | 114203879 | 3/2022 |
| CN | 215954024 | 3/2022 |
| CN | 114628568 | 6/2022 |
| JP | 2005-234117 | 9/2005 |
| JP | 2011-205142 | 10/2011 |

OTHER PUBLICATIONS

Notice of Reasons for Refusal Dated Oct. 20, 2024 From the Japan Patent Office Re. Application No. 2022-572451 and Its Translation Into English. (11 Pages).

Notification of Office Action and Search Report Dated Sep. 7, 2024 From The State Intellectual Property Office of the People's Republic of China Re. Application No. 202210916195.9 and Its Translation Into English. (18 Pages).

\* cited by examiner

BACKLIGHT BOARD, MANUFACTURING METHOD AND DISPLAY PANEL

RELATED APPLICATIONS

This application is a National Phase of PCT Patent Application No. PCT/CN2022/110822 having International filing date of Aug. 8, 2022, which claims the benefit of priority of Chinese Patent Application No. 202210916195.9 filed on Aug. 1, 2022. The contents of the above applications are all incorporated by reference as if fully set forth herein in their entirety.

FIELD AND BACKGROUND OF THE INVENTION

The present application relates to a field of display technologies, especially to a backlight board, a manufacturing method, and a display panel.

A number of lamp beads of the lamp board of a mini light emitting diode (Mini-LED) backlight product is enormous such that a lamp board has a high demand to windows making precision for a white resist soldering ink, and generally a photosensitive type white oil is used. Because a reflectivity of the photosensitive type white oil is in proportion to a film thickness of the white oil, the film thickness of the white oil is drastically large when the reflectivity is required to be high. An excessively large thickness of the white oil would lead to incomplete cure of a bottom portion of the white oil when the white oil is exposed such that the incompletely cured white oil is etched from a side to form a bottom-cut structure during a development process.

SUMMARY OF THE INVENTION

Technical Issue

Because a bottom-cut structure is a hollow structure and is fragile and separate when subjecting to an external force, it results in a poor product and a dark lamp phenomenon when separated and falling into a soldering pads region. Furthermore, after a white oil with an excessively large thickness undergoes a high temperature process, inconsistency between thermal expansion coefficients of the white oil and glass generates a stress to lead to a substrate warpage, the excessive warpage easily causes a broken product.

Technical Solution

As such, it is necessary to aim at issues of fragileness and warpage of a white oil layer of a conventional backlight board and provide a backlight board and manufacturing method.

To achieve the above objective, in a first aspect, the embodiment of the present application provides a backlight board, including a substrate, a reflective layer, a white oil layer, soldering pads, and lamp beads;
  wherein the substrate carries the reflective layer, the white oil layer, the soldering pads, and the lamp beads; windows are defined in the white oil layer; the soldering pads are disposed in the windows; and the lamp beads are electrically connected to the soldering pads; and
  wherein the reflective layer is disposed on a side of the white oil layer near the substrate.

In a second aspect, the embodiment of the present application provides a backlight board manufacturing method, including steps as follows:
  providing a substrate;
  forming a reflective layer on the substrate;
  forming soldering pads on the substrate;
  forming a white oil layer on the substrate, wherein windows are defined in the white oil layer, and the soldering pads are disposed in the windows; and
  soldering lamp beads on the soldering pads;
  wherein the reflective layer is disposed on a side of the white oil layer near the substrate.

In a third aspect, the embodiment of the present application provides a display panel, including a main control board, a diffuser board, a diffuser plate, a driver circuit board, a vertical polarizer, a thin film transistor (TFT) glass board, a liquid crystal layer, a color filter, a horizontal polarizer, and a backlight board;
  wherein the main control board, the backlight board, the diffuser board, the diffuser plate, the driver circuit board, the vertical polarizer, the TFT glass board, the liquid crystal layer, the color filter, and the horizontal polarizer are disposed sequentially;
  wherein the backlight board includes a substrate, a reflective layer, a white oil layer, soldering pads, and lamp beads;
  wherein the substrate carries the reflective layer, the white oil layer, the soldering pads, and the lamp beads; windows are defined in the white oil layer; the soldering pads are disposed in the windows; and the lamp beads are electrically connected to the soldering pads; and
  wherein the reflective layer is disposed on a side of the white oil layer near the substrate.

Advantages

The backlight board provided by each of embodiments the present application uses the substrate to carry the reflective layer, the white oil layer, the soldering pads, and the lamp beads. Windows configured to accommodate soldering pads are defined in the white oil layer. The lamp beads are electrically connected to the soldering pads. The reflective layer is configured to reflect light emitted from the electrified lamp beads to achieve reflection light emitted from the lamp beads to the reflective, improvement of the reflectivity of the backlight board, and enhancement of the light usage rate of the backlight board. The reflectivity of the backlight board enhanced on the reflective layer can reduce a usage amount of the white oil layer and decrease a thickness of the white oil layer. The thinned white oil layer can be completely cured during the curing process to prevent an issue of a bottom-cut structure generated during the development process and causing the broken white oil layer. Furthermore, the thinned white oil layer can also prevent an issue of warpage due to a thermal expansion coefficient greatly different from that of the substrate.

DESCRIPTION OF SPECIFIC EMBODIMENTS OF THE INVENTION

To facilitate understanding of the present application, the present application will be described more fully below with reference to the attached drawings. The preferred embodiment of the present application is given in the attached drawings. However, the present application can be implemented in many different forms without limits by the embodiments described in the specification. On the contrary, the objective of providing these embodiments is to make the disclosure of the present application more thorough.

It should be explained that when an element is considered to be "connected" to another element, it may be directly connected to and combined with another element, or there may be a co-existing centered element. Terms "install", "an end", "another end" and similar descriptions used in the specification are only for purposes of indication.

Unless having otherwise definition, all technical and scientific terms used in the specification have the same meaning as commonly understood by a person of ordinary skill in the art of the present application. Terms used in the specification in the description of the present application are only to describe the objective of a specific embodiment. It is not intended to limit the present application. The term "and/or" used in the specification includes any one and all of combinations of one or a plurality of related listed objectives.

A display panel is configured to display images or videos. The display panel generally includes a main control board, a diffuser board, a diffuser plate, a driver circuit board, a vertical polarizer, a thin film transistor (TFT) glass board, a liquid crystal layer, a color filter, a horizontal polarizer, and a backlight board 1.

The main control board is a control center of the display panel, is configured to control cooperation work of devices in the display panel. In an example, main control board includes a controller and a processor. The diffuser board can evenly diffuse light emitted from the backlight board 1 to a thin sheet or a thin film of an entire plane. In an example, a substrate material of the diffuser board is polyethylene terephthalate (PET), PC polycarbonate (PC), or polymethyl methacrylate (PMMA, organic glass). The diffuser plate can remove uneven brightness or bright spots. In an example, the diffuser plate is a thin sheet forming a protruding micro lens set on a main surface of a transparent sheet underlay. The driver circuit board provides lamp beads on the backlight board 1 with stable voltage or current driver signals. A vertical polarizer and a horizontal polarizer can control a polarizing direction of light beams. In an example, a material of the polarizer is polyvinyl alcohol. A thin film transistor (TFT) glass board is used for pixels in the display panel. The liquid crystal layer includes liquid crystal molecules configured to change an arrangement direction under an electrical field effect. The color filter is a color filter presenting colors, and allow a wave band of a light-wave within a small range to pass, and reflect other wave band of the light-wave. The backlight board 1 is a device providing the display panel with a light source.

Figure 1:
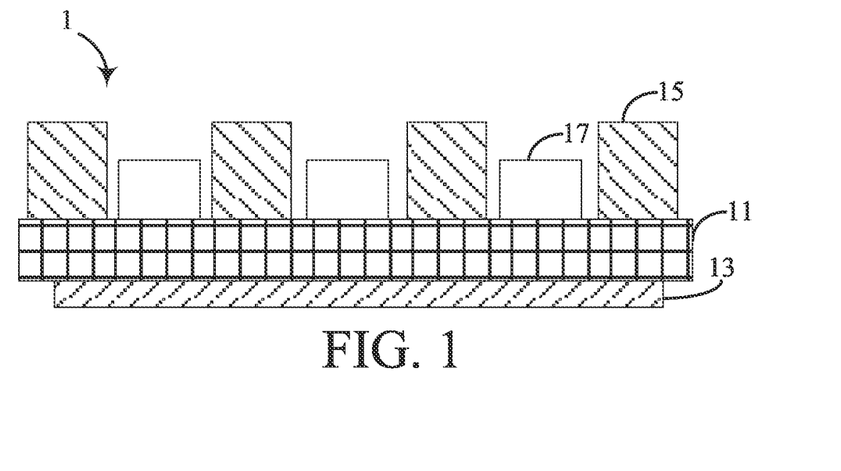
FIG. 1 is a schematic structural view of a backlight board provided by an embodiment of the present application.

The backlight board 1 is an important part in the display panel. However, a conventional backlight board 1 easily has issues of broken white oil layer 15 and warpage of the backlight board 1. To solve the issue, the embodiment of the present application provides a backlight board 1. With reference to FIG. 1, the backlight board 1 includes a substrate 11, a reflective layer 13, a white oil layer 15, soldering pads 17, and the lamp beads. The substrate 11 is configured to carry the reflective layer 13, the white oil layer 15, the soldering pads 17, and the lamp beads. It should be explained that the substrate 11 can be a transparent substrate 11, and also can be an opaque substrate 11. In an example, the transparent substrate 11 can be the glass substrate 11. In an example, the opaque substrate 11 is a printed circuit board (PCB) substrate 11, a metal substrate 11 (for example, aluminum), etc. In particular, the substrate 11 can be set according to actual demands and is not limited particularly here. A surface of the white oil layer 15 has an anti-soldering function. In another aspect, the white oil layer 15 also has a certain reflective light effect. In particular, the white oil layer 15 is formed by curing the white ink. The soldering pads 17 is a connector of a current transmission cable configured to connect the lamp beads. In an example, internals of the soldering pads 17 are metal wirings, and an outer layer thereof is enclosed with an anti-oxidation layer, and the anti-oxidation layer is conductive. The lamp beads light when electrified. In a formation structure of the backlight board 1, windows are defined in the white oil layer 15. It can be understood that the windows can be defined through or defined in the white oil layer 15, the soldering pads are defined in the windows. The lamp beads are electrically connected to the soldering pads 17. In particular, connecting ends of the lamp beads can be soldered to the soldering pads 17.

The reflective layer 13 is disposed on the substrate 11. In particular, the reflective layer 13 is disposed on a side of the white oil layer 15 near the substrate 11, is configured to reflect light emitted from the electrified lamp beads such that light emitted from the lamp beads irradiates the diffuser board as much as possible to improve a usage rate of a light source. Selection of materials for manufacturing the reflective layer 13 depends on reflection characteristics of the material. For example, the reflective layer 13 is made of white oil, the reflective layer 13 is made of white glue, the reflective layer 13 is made of copper, the reflective layer 13 is made of aluminum, or, the reflective layer 13 is made of silver, the material for manufacture is not limited here. Furthermore, according to different materials, used manufacturing processes are also different, for example, the reflective layer 13 can be manufactured by a process such as printing, gluing, sputtering, and embedding.

An arrangement method of the reflective layer 13 on the substrate 11 are at least three as follows:

In an example, with reference to FIG. 1, the backlight board 1 includes the substrate 11, the reflective layer 13, the white oil layer 15, the soldering pads 17, and the lamp beads. The substrate 11 includes a first plate surface and a second plate surface opposite to each other. Namely, the first plate surface can be called a front surface of the substrate 11, and the front surface is disposed toward a diffuser board of the display panel. The second plate surface can be called a rear surface of the substrate 11, and the rear surface is disposed away from the diffuser board of the display panel. The white oil layer 15, the soldering pads 17, and the lamp beads are disposed on the first plate surface. The reflective layer 13 is disposed on the second plate surface. In particular, the white oil layer 15 is disposed on the first plate surface, windows are defined in the white oil layer 15, the soldering pads 17 are disposed in the windows, and the lamp beads are soldered to the soldering pads 17. A number of the windows is equal to that of the lamp beads. The number of the lamp beads is set according to actual demands. The substrate 11 is configured to carry the reflective layer 13, the white oil layer 15, the soldering pads 17, and the lamp beads. It should be explained that the white oil layer 15 in an aspect has an anti-soldering function. In another aspect, the white oil layer 15 also has a certain reflective light effect. In particular, the white oil layer 15 is formed by curing the white ink. The soldering pads 17 is a connector of a current transmission cable configured to connect the lamp beads. In an example, internals of the soldering pads 17 are metal wirings, and an outer layer thereof is enclosed with an anti-oxidation layer, and the anti-oxidation layer is conductive. In another example, the soldering pads 17 are metal soldering points. The lamp beads light when electrified. In a formation structure of the backlight board 1, windows are defined in the white oil layer 15. It can be understood that the windows can be defined through or defined in the white oil layer 15, the soldering pads are defined in the windows. The lamp beads are electrically connected to the soldering pads 17. In particular, connecting ends of the lamp beads can be soldered to the soldering pads 17.

It should be explained that in the example, to guarantee that the reflective layer 13 performs a reflection function, the substrate 11 is a transparent substrate 11 to prevent light emitted from the lamp beads to extend through the substrate 11. In particular, light emitted from the electrified lamp beads extends through the substrate 11, is reflected by the reflective layer 13, extends back to the substrate 11, and then irradiates a diffuser board of the display panel.

Selection of materials of the reflective layer 13 aims at optical reflectivity, for example, the reflective layer 13 is made of white oil, the reflective layer 13 is made of white glue, the reflective layer 13 is made of copper, the reflective layer 13 is made of aluminum, or, the reflective layer 13 is made of silver. The material for manufacturing is not limited here. Furthermore, according to different materials, manufacturing processes are also different, for example, the reflective layer 13 can be manufactured by a process such as printing, gluing, and sputtering. An arrangement method of the reflective layer 13 in the example requires no change to the structure of the backlight board 1, but only needs to dispose a layer of the reflective layer 13 on a rear surface of the substrate 11 of the backlight board 1.

Figure 2:
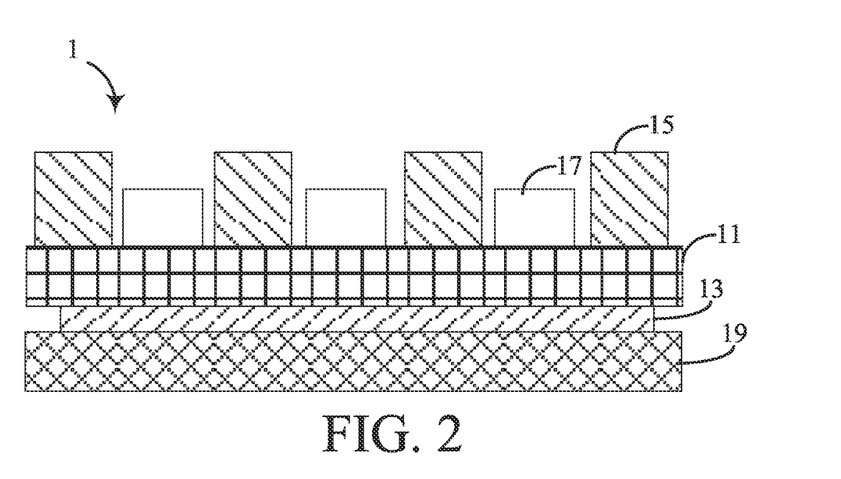
FIG. 2 is a schematic structural view of the backlight board provided by the embodiment of the present application.

In the example, for the reflective layer 13 to be stably disposed on the substrate 11 of the backlight board 1, with reference to FIG. 2, the backlight board 1 further includes an auxiliary substrate 19. The auxiliary substrate 19 covers the reflective layer 13 such that the reflective layer 13 is sandwiched between the substrate 11 and the auxiliary substrate 19. The auxiliary substrate 19 can be made of a metal material, and also can be made of a non-metal material. The auxiliary substrate 19 is connected to the substrate 11 of the backlight board 1 by adhere or screws to further secure the reflective layer 13 and rely on a protective effect of the auxiliary substrate 19, which improves a usage lifespan of the reflective layer 13 to improve usage lifespans of the backlight board 1 and the display panel.

Figure 3:
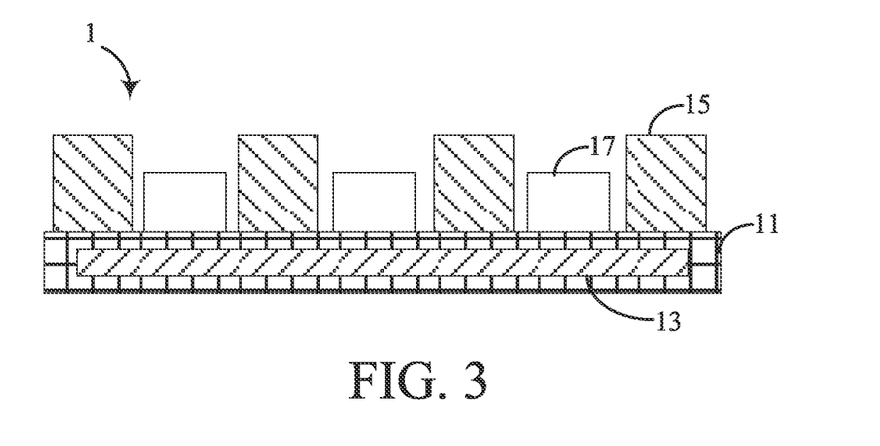
FIG. 3 is a schematic structural view of the backlight board provided by the embodiment of the present application.

In an example, the backlight board 1 includes the substrate 11, the reflective layer 13, the white oil layer 15, the soldering pads 17, and the lamp beads. With reference to FIG. 3, in the example, the reflective layer 13 is embedded inside the substrate 11. For example, the reflective layer 13 is manufactured in advance. During manufacturing the substrate 11 of the backlight board 1, the manufactured reflective layer 13 is immersed in a material for manufacturing the substrate 11. With cure of the material, the reflective layer 13 is embedded in the substrate 11 to form the substrate 11 with the reflective layer 13. The white oil layer 15 is disposed on the substrate 11, windows are defined in the white oil layer 15, the soldering pads 17 are disposed in the windows, and the lamp beads are soldered to the soldering pads 17. It should be explained that in an aspect the white oil layer 15 has an anti-soldering function, and in another aspect the white oil layer 15 also has a certain reflective light effect. In particular, the white oil layer 15 is formed by curing the white ink. The soldering pads 17 are a connector of the current transmission cable configured to connect the lamp beads. In an example, the soldering pads 17 are copper metal soldering points. The lamp beads light when electrified. In a formation structure of the backlight board 1, windows are defined in the white oil layer 15. It can be understood that the windows can be defined through or defined in the white oil layer 15, the soldering pads are defined in the windows. The lamp beads are electrically connected to the soldering pads 17. In particular, connecting ends of the lamp beads can be soldered to the soldering pads 17.

It should be explained that in the example, to guarantee that the reflective layer 13 performs a reflection function, the substrate 11 is a transparent substrate 11, for example, a plastic substrate 11 such that light emitted from the lamp beads is prevented from extending through the substrate 11. In particular, light emitted from the electrified lamp beads extends through the substrate 11, is reflected by the reflective layer 13, and irradiates a diffuser board of the display panel.

A position of the reflective layer 13 embedded in the substrate 11 can be changed according to actual demands. In an example, the reflective layer 13 is embedded in a middle region of the substrate 11.

In the example, embedding the reflective layer 13 in the substrate 11 can prevent the reflective layer 13 from oxidation and corrosion of air, water and improve reliability of the product.

Figure 4:
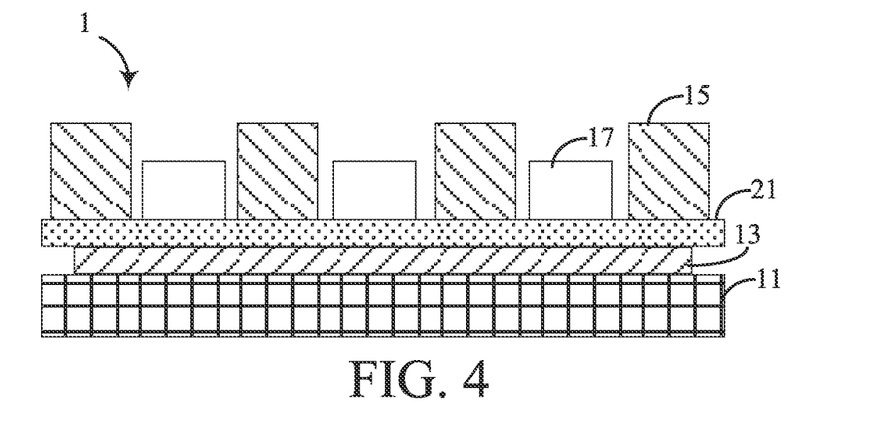
FIG. 4 is a schematic structural view of the backlight board provided by the embodiment of the present application.

In an example, with reference to FIG. 4, the backlight board 1 further includes the substrate 11, the reflective layer 13, the white oil layer 15, the soldering pads 17, the lamp beads, and a transparent insulation layer 21. In the example, the reflective layer 13 is disposed on an end surface of the substrate 11, the transparent insulation layer 21 is disposed on the reflective layer 13, and the white oil layer 15 is disposed on the transparent insulation layer 21. Windows are defined in the white oil layer 15, and the soldering pads 17 are disposed in the windows. The lamp beads are soldered to the soldering pads 17. It should be explained that the transparent insulation layer is configured to separate metal wirings corresponding to the reflective layer 13, the soldering pads 17, and the soldering pads 17. When the reflective layer 13 is made of a conductive layer material, it prevents crosstalk between metal wirings of the soldering pads 17 and the reflective layer 13 and affecting electric power transmission from the metal wirings to the lamp beads, for example, the transparent insulation layer 21 is glass, plastic, etc. It should be explained that the white oil layer 15 in an aspect has an anti-soldering function, and in another aspect the white oil layer 15 also has a certain reflective light effect. In particular, the white oil layer 15 is formed by curing white ink. The soldering pads 17 are a connector of a current transmission cable configured to connect the lamp beads. In an example, the soldering pads 17 are silver metal soldering points. The lamp beads light when electrified. In a formation structure of the backlight board 1, windows are defined in the white oil layer 15. It can be understood that the windows can be defined through or defined in the white oil layer 15, the soldering pads are defined in the windows. The lamp beads are electrically connected to the soldering pads 17. In particular, connecting ends of the lamp beads can be soldered to the soldering pads 17.

It should be explained that in the example, the substrate 11 can be the transparent substrate 11, can also be the opaque substrate 11. In the example, light emitted from the electrified lamp beads extends through the transparent insulation layer 21, is reflected by the reflective layer 13, and extends back to the transparent insulation layer 21.

In the example, the reflective layer 13 and other structures such as the white oil layer 15 are disposed in the same layer for convenience of setting processes.

Figure 5:
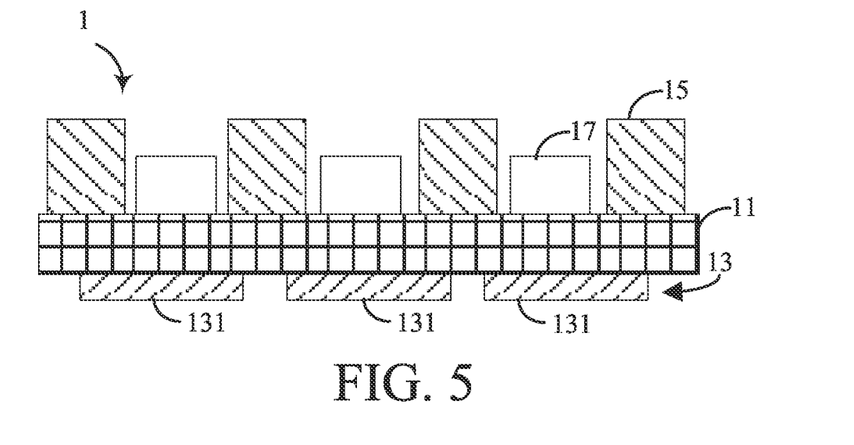
FIG. 5 is a schematic structural view of the backlight board provided by the embodiment of the present application.

The reflective layer 13 can be a complete material layer. Namely, a continuous reflective layer 13 is formed on the substrate 11. In an example, with reference to FIG. 5, the reflective layer 13 includes sub-reflective layers 131 having a number equal to that of the lamp beads. The reflective layer 13 is composed of a plurality of the sub-reflective layers 131, the sub-reflective layers 131 are independent from one another and have no contact with one another, namely, an emission layer is incomplete. The sub-reflective layers 131 on the substrate 11 are disposed to correspond to the lamp beads one by one, namely, each of the lamp beads is equipped with one of the sub-reflective layers 131. The sub-reflective layers 131 is configured to reflect light emitted from a corresponding one of the electrified lamp beads. According to the arrangement method of the reflective layer 13 on the substrate 11, similarly, the sub-reflective layers 131 can also have different formation methods. When the reflective layer 13 is disposed on a second plate surface (a rear surface of the substrate 11) of the substrate 11, in an example, the entire reflective layer 13 is disposed on the second plate surface first, and then the reflective layer 13 is cut according to arrangement positions of the lamp beads to form the sub-reflective layers 131. In another example, the sub-reflective layers 131 is manufactured in advance, and the sub-reflective layers 131 are disposed on positions corresponding to the lamp beads. When the reflective layer 13 is embedded inside the substrate 11, the sub-reflective layers 131 is manufactured in advance, and the sub-reflective layers 131 are arranged according to arrangement positions of the lamp beads. During manufacturing the substrate 11, the arranged the sub-reflective layers 131 is immersed in the material of the substrate 11, and then is cured. When the reflective layer 13 and the white oil layer 15 are disposed on the same side of the substrate 11, in an example, the entire reflective layer 13 is disposed on an end surface of the substrate 11 first, then the reflective layer 13 is cut according to the arrangement positions of the lamp beads to form the sub-reflective layers 131. In another example, the sub-reflective layers 131 are manufactured in advance, and the sub-reflective layers 131 are disposed to correspond to the positions of the lamp beads. It should be explained that areas of the sub-reflective layers 131 are required to fulfill most of light reflected toward the reflective layer 13.

The backlight board 1 in each embodiment, the substrate 11 is used to carry the reflective layer 13, the white oil layer 15, the soldering pads 17, and the lamp beads. The windows configured to accommodate the soldering pads 17 are defined in the white oil layer 15. The lamp beads are electrically connected to the soldering pads 17. The reflective layer 13 is configured to reflect light emitted from the electrified lamp beads to achieve reflection of light emitted from the lamp beads to the reflective layer 13, improvement of a reflectivity of the backlight board 1, and enhancement of light usage rate of the backlight board 1. The reflectivity of the backlight board 1 enhanced on the reflective layer 13 can reduce a usage amount of the white oil layer 15, reduce the thickness of the white oil layer 15, and the thinned white oil layer 15 can be completely cured during the curing process to prevent the issue of a bottom-cut structure generated during the development process and causing the broken white oil layer 15. Furthermore, the thinned white oil layer 15 can also prevent the issue of warpage due to a thermal expansion coefficient greatly different from that of the substrate 11.

Figure 6:
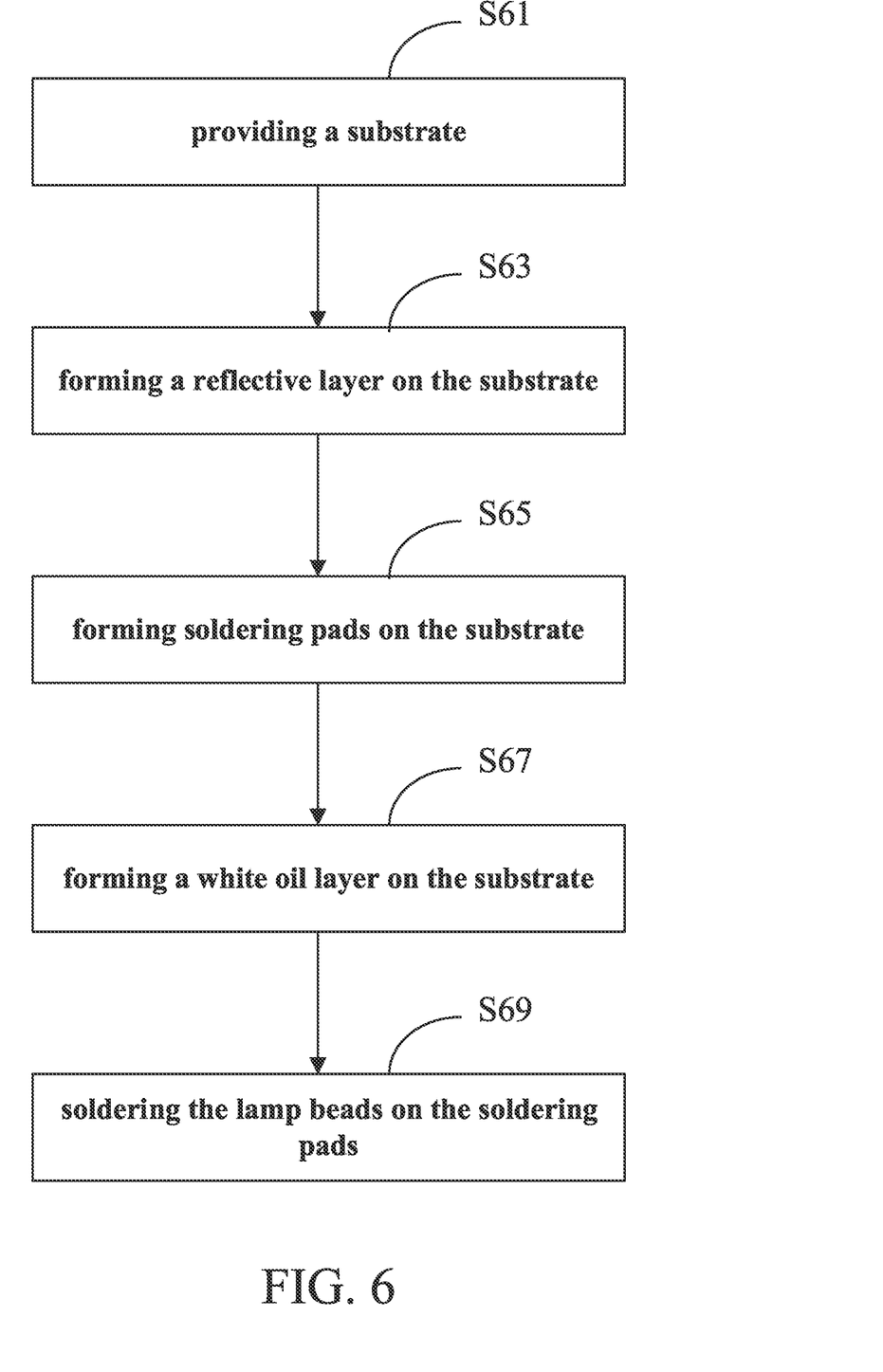
FIG. 6 is a flowchart of a backlight board manufacturing method provided by the embodiment of the present application.

In an embodiment, provides a manufacturing method for the backlight board 1, as shown in FIG. 6, including steps as follows:

A step S61 includes providing a substrate 11. The substrate 11 can be a transparent substrate 11, and also can be an opaque substrate 11. In an example, the transparent substrate 11 can be the glass substrate 11. In an example, the opaque substrate 11 is a printed circuit board (PCB) substrate 11, a metal substrate 11 (for example, aluminum), etc. In particular, the substrate 11 can be set according to actual demands and is not limited particularly here.

A step S63 includes forming a reflective layer 13 on the substrate 11. A material for manufacturing the reflective layer 13 is any one of white oil, white glue, copper, aluminum, and silver. According to different materials, used manufacturing processes are also different, for example, the reflective layer 13 can be manufactured by a process such as printing, gluing, sputtering, and embedding. The reflective layer 13 at least has three arrangement methods: According to a first method, the reflective layer 13 is disposed on a rear surface of the substrate 11. According to a second method, the reflective layer 13 is disposed on a front surface of the substrate 11. According to a third method, the reflective layer 13 is disposed inside the substrate 11. According to different disposing methods, the methods of forming the reflective layer 13 on the substrate 11 are also different. In the first method and the third method, the reflective layer 13 can be manufactured by a process such as printing, gluing, and sputtering. In the second method, the reflective layer 13 can be manufactured in advance. During formation of the substrate 11, the reflective layer 13 is cured in the substrate 11.

When the reflective layer 13 includes a plurality of sub-reflective layers 131, a complete reflective layer 13 can be formed on the substrate 11 and then the reflective layer 13 is cut out, or the sub-reflective layers 131 is manufactured in advance, and then the sub-reflective layers 131 is disposed in the substrate 11. It should be explained that the reflective layer 13 is configured to partially reflect light from the electrified lamp beads on the backlight board 1.

A step S65 includes forming soldering pads 17 on the substrate 11. In particular, during disposing metal wirings on the front surface of the substrate 11, the soldering pads 17 are disposed on the metal wirings. In an example, internals of the soldering pads 17 are metal wirings, and an outer layer thereof is enclosed with an anti-oxidation layer, and the anti-oxidation layer is conductive. In another example, the soldering pads 17 are metal soldering points.

A step S67 includes forming a white oil layer 15 on the substrate 11, wherein windows are defined in the white oil layer 15, and the soldering pads 17 are disposed in the windows. In particular, a white ink is coated on the substrate 11 to cover the soldering pads 17, the white ink is cured, and then white ink is processed by processes of exposure and development to form windows to expose the soldering pads 17.

A step S69 includes soldering the lamp beads on the soldering pads 17.

It should be explained that when the reflective layer 13 is disposed on a front surface of the substrate 11, the method further includes a step between the step S and the step S as follows:

The transparent insulation layer 21 is formed on the reflective layer 13. The white oil layer 15 is formed on the transparent insulation layer 21. The transparent insulation layer is configured to separate metal wirings corresponding to the reflective layer 13, the soldering pads 17, and the soldering pads 17. When the reflective layer 13 is made of a conductive layer material, it prevents crosstalk between metal wirings of the soldering pads 17 and the reflective layer 13 and affecting electric power transmission from the metal wirings to the lamp beads, for example, the transparent insulation layer 21 is glass, plastic, etc.

The backlight board 1 manufactured by the manufacturing method of the present application uses the reflective layer 13 to reflect light emitted from the electrified lamp beads to achieve reflection of light emitted from the lamp beads to the reflective layer 13, improvement of a reflectivity of the backlight board 1, and enhancement of light usage rate of the backlight board 1. The reflectivity of the backlight board 1 enhanced on the reflective layer 13 can reduce a usage amount of the white oil layer 15, reduce the thickness of the white oil layer 15, and the thinned white oil layer 15 can be completely cured during the curing process to prevent the issue of a bottom-cut structure generated during the development process and causing the broken white oil layer 15. Furthermore, the thinned white oil layer 15 can also prevent the issue of warpage due to a thermal expansion coefficient greatly different from that of the substrate 11.

Technical features of the above embodiments can be combined randomly. To make the description concise, not all possible combinations of the technical features in the above embodiments are described. However, combinations of these technical features should be deemed as within a range of descriptions of the specification as long as no conflict exists.

The above embodiments only indicate several embodying ways of the present application, descriptions thereof are more specific and detailed but cannot be understood as a limit to claims. It should be pointed out that for a person of ordinary skill in the art, under a precondition not departing from ideas of the present application, several variants and improvements can also be made and these all belong to a protective scope of the present application. Therefore, the patent protective scope of the present application should be based on the attached claims.

What is claimed is:

1. A backlight board, comprising a substrate, a reflective layer, a white oil layer, soldering pads, and lamp beads;
   wherein the substrate is transparent and carries the reflective layer, the white oil layer, the soldering pads, and the lamp beads; windows are defined in the white oil layer; the soldering pads are disposed in the windows; and the lamp beads are electrically connected to the soldering pads; and
   wherein the reflective layer is completely embedded inside the substrate.

2. The backlight board according to claim 1, wherein the backlight board further comprises an auxiliary substrate; and
   the reflective layer is sandwiched between the substrate and the auxiliary substrate.

3. The backlight board according to claim 1, wherein the reflective layer is embedded in a middle region of the substrate.

4. The backlight board according to claim 1, wherein the backlight board further comprises transparent insulation layer; and
   the reflective layer is disposed on an end surface of the substrate; the transparent insulation layer is disposed on the reflective layer; and the white oil layer is disposed on transparent insulation layer.

5. The backlight board according to claim 1, wherein the reflective layer comprises sub-reflective layers having a number equal to that of the lamp beads, and the sub-reflective layers have no contact with one another; and
   the sub-reflective layers on the substrate are disposed to correspond to the lamp beads one by one.

6. The backlight board according to claim 1, wherein a material of the reflective layer is any one of white oil, white glue, copper, aluminum, and silver.

7. A backlight board manufacturing method, comprising steps as follows:
   providing a substrate that is transparent;
   forming a reflective layer on the substrate;
   forming soldering pads on the substrate;
   forming a white oil layer on the substrate, wherein windows are defined in the white oil layer, and the soldering pads are disposed in the windows; and
   soldering lamp beads on the soldering pads;
   wherein the reflective layer is completely embedded inside the substrate.

8. A display panel, comprising a main control board, a diffuser board, a diffuser plate, a driver circuit board, a vertical polarizer, a thin film transistor (TFT) glass board, a liquid crystal layer, a color filter, a horizontal polarizer, and a backlight board;
   wherein the main control board, the backlight board, the diffuser board, the diffuser plate, the driver circuit board, the vertical polarizer, the TFT glass board, the liquid crystal layer, the color filter, and the horizontal polarizer are disposed sequentially;
   wherein the backlight board comprises a substrate, a reflective layer, a white oil layer, soldering pads, and lamp beads;
   wherein the substrate is transparent and carries the reflective layer, the white oil layer, the soldering pads, and the lamp beads; windows are defined in the white oil layer; the soldering pads are disposed in the windows; and the lamp beads are electrically connected to the soldering pads; and
   wherein the reflective layer is completely embedded inside the substrate.

9. The display panel according to claim 8, wherein the backlight board further comprises an auxiliary substrate; and
   the reflective layer is sandwiched between the substrate and the auxiliary substrate.

10. The display panel according to claim 8, wherein the reflective layer is embedded in a middle region of the substrate.

11. The display panel according to claim 8, wherein the backlight board further comprises transparent insulation layer; and the reflective layer is disposed on an end surface of the substrate; the transparent insulation layer is disposed on the reflective layer; and the white oil layer is disposed on transparent insulation layer.

12. The display panel according to claim 8, wherein the reflective layer comprises sub-reflective layers having a number equal to that of the lamp beads, and the sub-reflective layers have no contact with one another; and the sub-reflective layers on the substrate are disposed to correspond to the lamp beads one by ones.

13. The display panel according to claim 8, wherein a material of the reflective layer is any one of white oil, white glue, copper, aluminum, and silver.

\* \* \* \* \*